United States Patent
Ding et al.

(10) Patent No.: US 11,239,461 B2
(45) Date of Patent: Feb. 1, 2022

(54) ELECTRICALLY CONDUCTIVE POROUS PARTICLE

(71) Applicant: AGENCY FOR SCIENCE, TECHNOLOGY AND RESEARCH, Singapore (SG)

(72) Inventors: Ning Ding, Singapore (SG); Yanwei Lum, Singapore (SG); Tzi Sum Andy Hor, Singapore (SG); Zhao Lin Liu, Singapore (SG); Yun Zong, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 88 days.

(21) Appl. No.: 16/569,563

(22) Filed: Sep. 12, 2019

(65) Prior Publication Data
US 2020/0075940 A1 Mar. 5, 2020

Related U.S. Application Data

(62) Division of application No. 15/311,184, filed as application No. PCT/SG2015/050114 on May 14, 2015, now Pat. No. 10,454,100.

(30) Foreign Application Priority Data

May 14, 2014 (SG) .............. 10201402315P

(51) Int. Cl.
*H01M 4/36* (2006.01)
*H01M 4/62* (2006.01)
(Continued)

(52) U.S. Cl.
CPC ............. *H01M 4/366* (2013.01); *B01J 13/08* (2013.01); *B01J 13/20* (2013.01); *C01B 17/20* (2013.01);
(Continued)

(58) Field of Classification Search
None
See application file for complete search history.

(56) References Cited

U.S. PATENT DOCUMENTS 10,454,100 B2 * 10/2019 Ding .................. C01G 1/12
2001/0002275 A1 * 5/2001 Oldenburg ............. B01J 13/02
427/214

(Continued)

OTHER PUBLICATIONS

The International Preliminary Report on Patentability for PCT Application No. PCT/SG2015/050114 dated Nov. 15, 2016, 5 pages.
(Continued)

*Primary Examiner* — Lisa S Park
(74) *Attorney, Agent, or Firm* — Womble Bond Dickinson (US) LLP

(57) ABSTRACT

There is provided a method of forming a porous particle comprising an electrically conductive continuous shell encapsulating a core, said core comprising an elemental compound that reversibly reduces in the presence of a cation and oxidizes in the absence of said cation, said method comprising the steps of: a) encapsulating an elemental compound precursor with said electrically conductive shell; b) reacting said elemental compound precursor with an oxidation agent to oxidise said elemental compound precursor to form said elemental compound, thereby forming said electrically conductive shell encapsulating said core comprising said elemental compound.

7 Claims, 5 Drawing Sheets

(51) Int. Cl.
  *H01M 4/58* (2010.01)
  *C01B 17/20* (2006.01)
  *C01G 9/08* (2006.01)
  *C01G 1/12* (2006.01)
  *B01J 13/08* (2006.01)
  *B01J 13/20* (2006.01)

(52) U.S. Cl.
  CPC .............. *C01G 1/12* (2013.01); *C01G 9/08* (2013.01); *H01M 4/5815* (2013.01); *H01M 4/625* (2013.01); *C01P 2002/88* (2013.01); *C01P 2004/03* (2013.01); *C01P 2004/04* (2013.01); *C01P 2004/34* (2013.01); *C01P 2004/62* (2013.01); *C01P 2004/80* (2013.01)

(56) References Cited

U.S. PATENT DOCUMENTS

| | | | |
|---|---|---|---|
| 2005/0082521 A1* | 4/2005 | Torimoto | B01J 27/04 257/17 |
| 2013/0224594 A1 | 8/2013 | Yushin et al. | |
| 2017/0162864 A1* | 6/2017 | Peled | H01M 4/624 |

OTHER PUBLICATIONS

PCT Notification of Transmittal of the International Search Report and the Written Opinion of the International Searching Authority, or the Declaration for PCT Counterpart Application No. PCT/SG2015/050114 dated Jun. 30, 2015, 9 pages.
The Examination Report for Singaporean Application No. 11201609456Y dated May 2, 2018, 5 pages.
The Written Opinion for Singaporean Application No. 11201609456Y dated Sep. 28, 2017, 6 pages.
Zhou, et al., "Yolk-Shell Structure of Polyaniline-Coated Sulfur for Lithium-Sulfur Batteries," Journal of the American Chemical Society, 2013, pp. 16736-16743, vol. 135, 8 pages.
The Restriction Requirement of related U.S. Appl. No. 15/311,184, dated Jul. 6, 2018, 6 pages.
The Non-Final Office Action of related U.S. Appl. No. 15/311,184, dated Sep. 6, 2018, 10 pages.
The First Notice of Allowance of related U.S. Appl. No. 15/311,184, dated Feb. 27, 2019, 8 pages.
The Second Notice of Allowance of related U.S. Appl. No. 15/311,184, dated Jun. 12, 2019, 11 pages.

* cited by examiner

[Fig. 1]
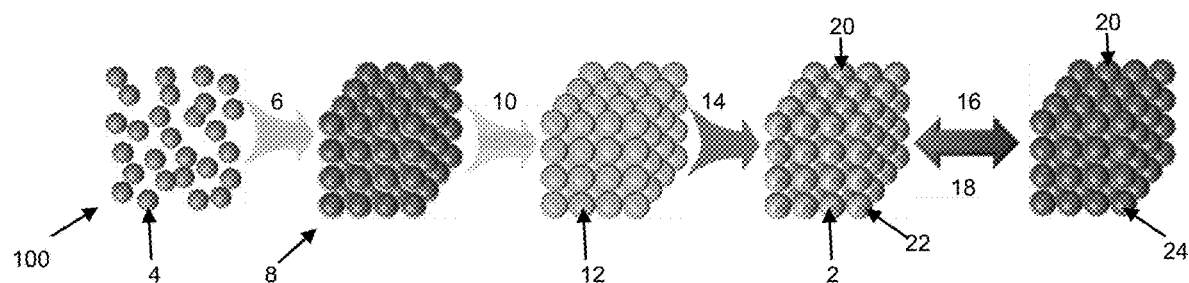
[Fig. 2A]
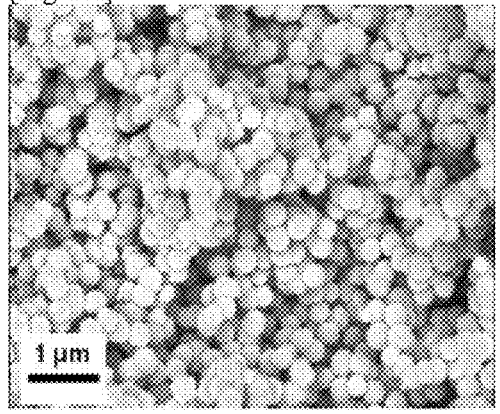
[Fig. 2B]
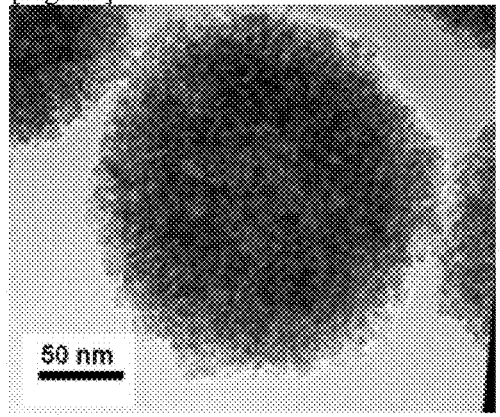
[Fig. 3A]
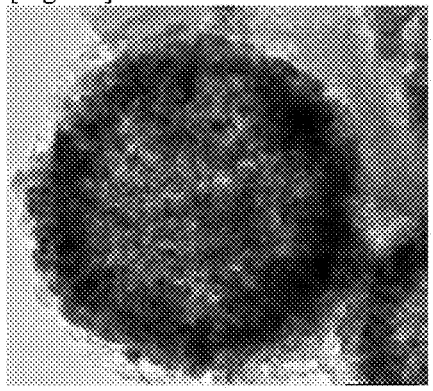
[Fig. 3B]
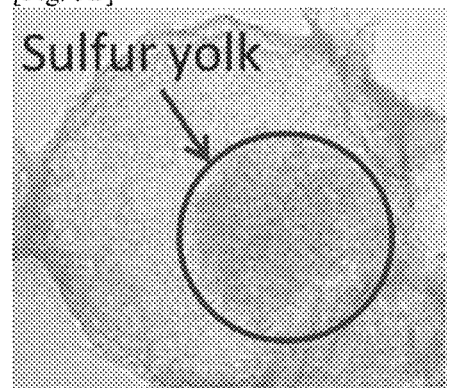

[Fig. 4A]
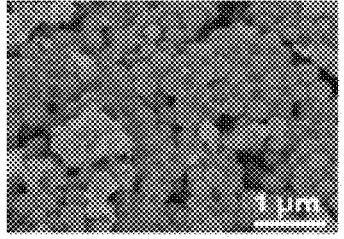
[Fig. 4B]
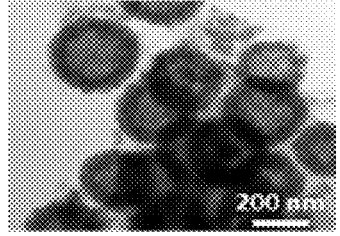
[Fig. 4C]
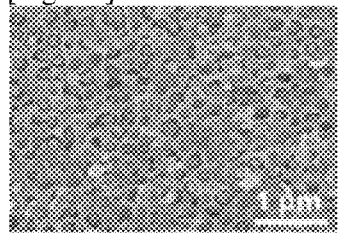
[Fig. 4D]
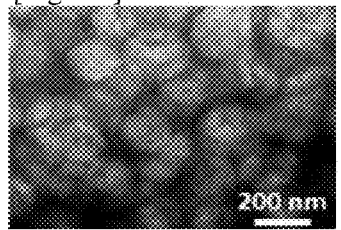
[Fig. 4E]
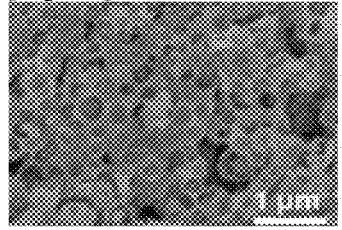
[Fig. 4F]
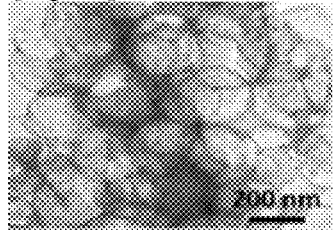
[Fig. 4G]
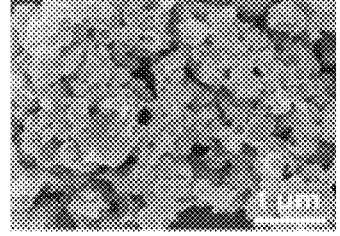
[Fig. 4H]
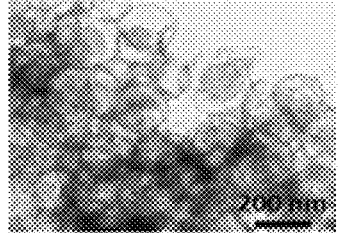
[Fig. 4I]
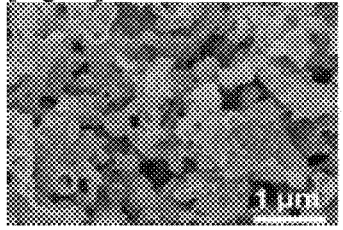
[Fig. 4J]
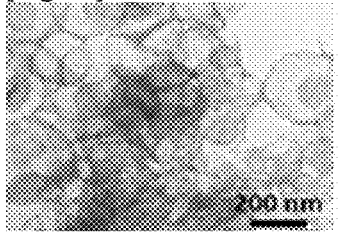

[Fig. 5A]
[Fig. 5B]
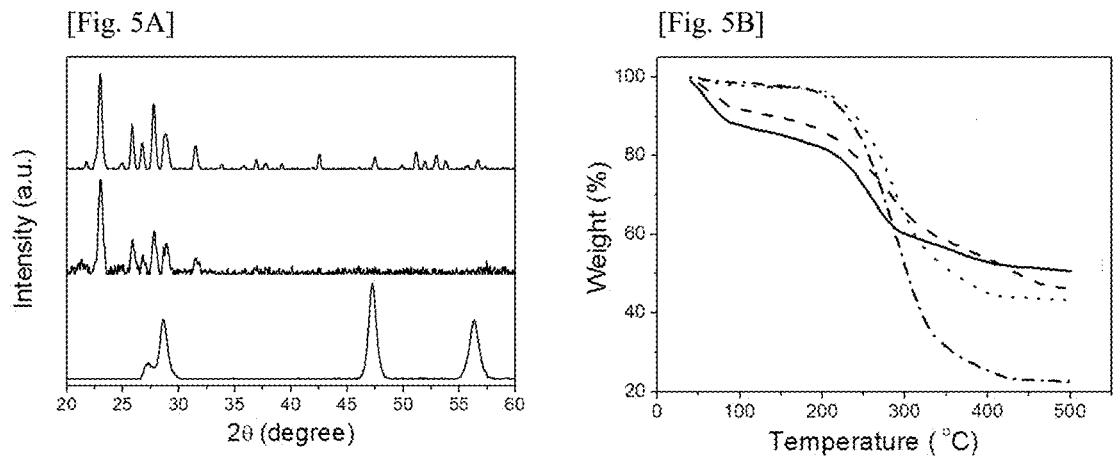
[Fig. 6]
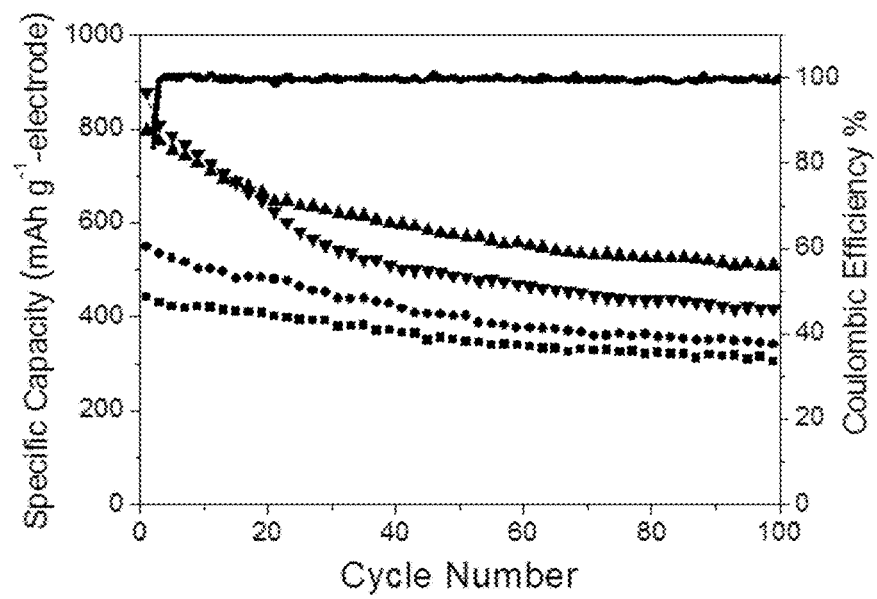
[Fig. 7]
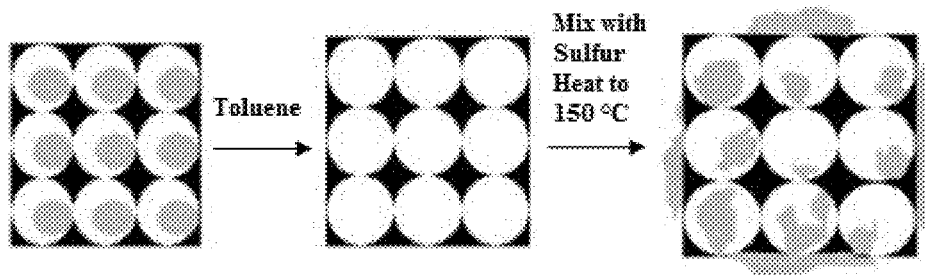

[Fig. 8]
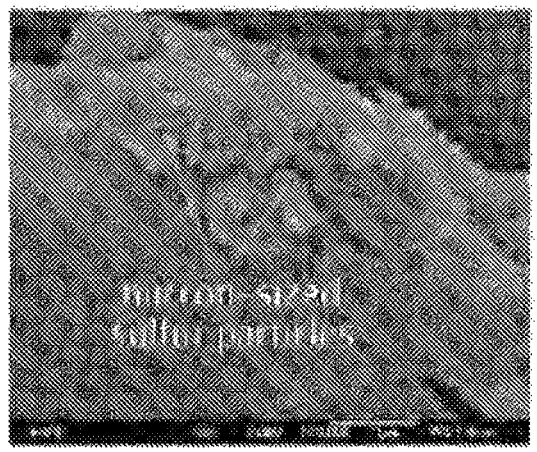
[Fig. 9]
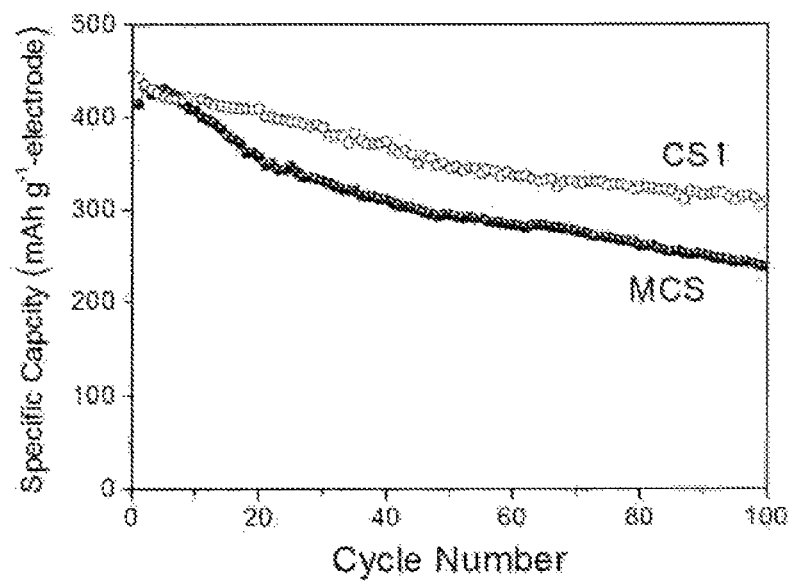

[Fig. 10A] 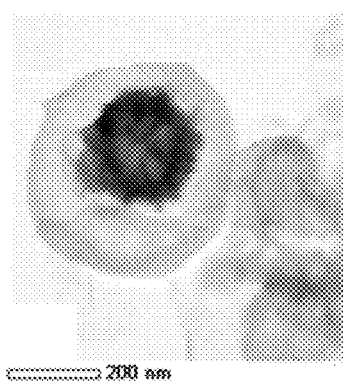
[Fig. 10B] 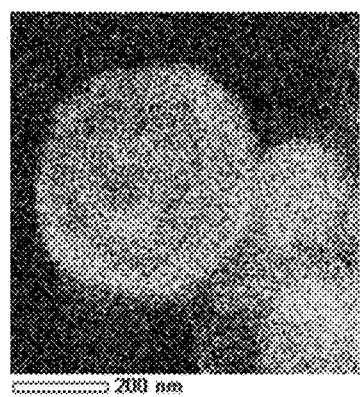
[Fig. 10C] 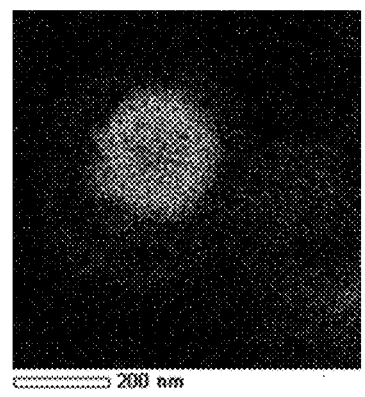

ELECTRICALLY CONDUCTIVE POROUS PARTICLE

CROSS-REFERENCE TO RELATED APPLICATIONS

This patent application is a divisional application of U.S. patent application Ser. No. 15/311,184, filed Nov. 14, 2016, which is a U.S. National Phase Application under 35 U.S.C. § 371 of International Application No. PCT/SG2015/050114, filed May 14, 2015, entitled A METHOD OF FORMING A POROUS PARTICLE, which claims priority to Singapore Patent Application No. 10201402315P, filed May 14, 2014.

TECHNICAL FIELD

The present invention generally relates to a method of forming a porous particle and uses of the porous particle.

BACKGROUND ART

High-performance batteries can serve as part of a solution to supply and storage problems as well as environmental issues related to the replacement of fossil-fuel-based energy with clean alternative energy. Rechargeable batteries (also called secondary batteries) are an essential tool on the way to achieve this goal.

Rechargeable batteries differ from their non-rechargeable counterparts in that they may be connected to an electricity supply, such as a wall socket, be recharged and used again. In rechargeable batteries, each charge/discharge process is called a cycle. Rechargeable batteries eventually reach an end of their usable life, but typically only after many charge/discharge cycles.

Currently, rechargeable lithium-ion (Li-ion) batteries are the most widely used rechargeable batteries. Existing Li-ion batteries are based on $LiCoO_2$ cathodes and graphite anodes. This leading Li-ion battery technology is based on intercalation reactions and is believed to be limited to a theoretical specific energy density of ~370 Wh $kg^{-1}$ and theoretical specific capacity <200 mAh $g^{-1}$ for the $LiCoO_2$/graphite.

Rechargeable lithium-sulfur batteries (Li—S), on the other hand, are of interest because of the high theoretical specific energy density (2600 Wh $kg^{-1}$), high theoretical specific capacity (1680 mAh $g^{-1}$), low material cost, and low safety risk that they possess.

However, lithium-sulfur batteries suffer from a number of drawbacks such as (1) leakage of sulfur and polysulfides from the host during discharge process; 2) poor control over the free volume that shall be in place inside of the cathode materials to accommodate the large volume expansion of sulfur by lithiation during discharge process (formation of $Li_2S$, corresponding to ~78.7% of volume expansion); and 3) poor electrical conductivity of the bulk sulfur. All these factors will lead to capacity fading and poor cyclability of the lithium-sulfur batteries. These disadvantages cannot be resolved by the current available methods to form such rechargeable lithium-sulfur batteries.

There is therefore a need to provide a method of forming a component of a rechargeable battery that overcomes, or at least ameliorates, one or more of the disadvantages described above.

SUMMARY OF INVENTION

According to a first aspect, there is provided a method of forming a porous particle comprising an electrically conductive shell encapsulating a core, said core comprising an elemental compound that reversibly reduces in the presence of a cation and oxidizes in the absence of said cation, said method comprising the steps of:

a) encapsulating an elemental compound precursor with said electrically conductive shell;

b) reacting said elemental compound precursor with an oxidation agent to oxidise said elemental compound precursor to form said elemental compound, thereby forming said electrically conductive shell encapsulating said core comprising said elemental compound.

Advantageously, this method may allow for the encapsulation of an elemental compound that would normally be destroyed by currently available methods of forming a lithium-sulfur battery.

The encapsulation of the elemental compound may also ensure that the elemental compound is not lost during discharge of the battery as the elemental compound is confined by the electrically conductive shell.

Further advantageously, this method may allow for the core to possess a smaller volume than the inner volume of the encapsulating shell therefore creating a void inside the shell, in which the void is disposed between the core and the shell. Due to the presence of the void, the core may increase in volume without damaging or destroying the encapsulating shell. The void may be formed during the reacting step (b).

The method may result in a plurality of porous particles being formed in which the electrically conductive shells are in close proximity with each other. Due to the interconnected shells, this may ensure that good electrical contact is maintained from one particle to the other, ensuring that the plurality of porous particles (which may form a matrix) has good electrical conductivity as a whole. The encapsulated elemental compound within each porous particle then encounters lesser electrical resistance as compared to a bulk elemental compound (that is, one that is not encapsulated by an electrically conductive shell).

According to a second aspect, there is provided a porous particle comprising an electrically conductive shell encapsulating a core, said core comprising an elemental compound precursor that oxidizes in the presence of an oxidation agent to form an elemental compound.

According to a third aspect, there is provided a cathode comprising a plurality of porous particles, each porous particle made according to the method as defined above, wherein each porous particle comprises an electrically conductive shell encapsulating a core, said core comprising an elemental compound that reversibly reduces in the presence of a cation and oxidizes in the absence of said cation.

Advantageously, choosing the elemental compound so that it may reversibly be reduced in the presence of a cation and oxidized in the absence of that cation may allow the porous particle to be used in a battery such as a rechargeable battery.

According to a fourth aspect, there is provided a battery comprising an anode; the cathode as defined above; and an electrolyte comprising the cation.

Advantageously, having a void inside the shell may allow the core to increase in volume without damaging or destroying the shell. This may aid in minimizing loss in efficiency when the battery charges and discharges repeatedly.

Definitions

The following words and terms used herein shall have the meaning indicated:

The term 'porous particle' is to be interpreted broadly to refer to a particle having a structure containing pores. The pores may be present on the outer surface of the particle or may extend from the outer surface to a point in the inner volume of the particle. Where the particle has a core-shell configuration, the pores may be present in the shell. The pores may be present on the outer surface of the shell or may extend throughout a part of or the entire thickness of the shell. The porous structure may allow the movement of chemicals between an external environment and the interior of the particle.

The term 'electrically conductive' is to be interpreted broadly to refer to a material or compound having a measurable level of electrical conductivity and that which allows an electric current to be passed through.

The term 'void' is to be interpreted broadly to refer to a space or volume where no solid matter is present, but in which gas and/or a liquid can be present.

The term 'nanoparticle' is to be interpreted broadly to refer to a particle possessing a dimension that less than about 1000 nm, less than about 500 nm or less than about 100 nm.

The term 'elemental compound' is to be interpreted broadly to refer to a compound that is formed by one or several identical atoms such as $O_2$, $S_8$, $N_2$, Fe, $I_2$ etc. The phrase 'elemental compound that reversibly reduces in the presence of a cation and oxidizes in the absence of said cation' is to be interpreted broadly to refer to a sequence of chemical reactions where firstly an elemental compound is being reduced by way of a spontaneous chemical reduction reaction when in contact with the cation to form a complex and secondly reversion of the complex to the elemental compound and the cation (whether as separate molecules or as when present as an intermediary complex as long as there is an increase in the oxidation state of the elemental compound) by way of a chemical oxidation reaction when the cation dissociates from the complex.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

Detailed Disclosure of Optional Embodiments

Exemplary, non-limiting embodiments of a method of forming a porous particle comprising an electrically conductive continuous shell encapsulating a core, the core comprising an elemental compound that reversibly reduces in the presence of a cation and oxidizes in the absence of said cation, will now be disclosed.

The method may comprise the steps of (a) encapsulating an elemental compound precursor with the electrically conductive shell; and (b) reacting the elemental compound precursor with an oxidation agent to oxidise the elemental compound precursor to form the elemental compound, thereby forming the electrically conductive shell encapsulating the core comprising the elemental compound.

In the method, when the elemental compound precursor is oxidized in step (b), a void that is disposed between the shell and the core may be created. The volume occupancy of the void between the shell and the core may be about 10% to about 95%, about 10% to about 20%, about 10% to about 30%, about 10% to about 40%, about 10% to about 50%, about 10% to about 60%, about 10% to about 70%, about 10% to about 80%, about 10% to about 90%, about 20% to about 95%, about 30% to about 95%, about 40% to about 95%, about 50% to about 95%, about 60% to about 95%, about 70% to about 95%, about 80% to about 95%, about 90% to about 95%, or about 40% to about 80%.

The elemental compound may be selected from the Group 15 or 16 of the Periodic Table of Elements. Hence, the elemental compound may be selected from the group consisting of phosphorus, arsenic, antimony, sulfur, selenium, tellurium and polonium. The elemental compound may be sulfur. The elemental compound may reduce by way of a spontaneous chemical reduction reaction when in contact with a cation to form a complex, which reverts to the elemental compound and the cation (whether as separate molecules or as when present as an intermediary complex as long as there is an increase in the oxidation state of the elemental compound) by way of a chemical oxidation reaction when the cation dissociates from the complex. The complex may have the formula $M_xEC_n$, where M refers to the cation, x refers to the number of atoms of the cation, EC refers to the elemental compound and n refers to the number of atoms of the elemental compound.

The elemental compound precursor may be a metal chalcogenide. The metal of the metal chalcogenide may be selected from Group 7, 8, 9, 10, 11, 12, or 14 of the Periodic Table of Elements. The metal may be selected from the group consisting of manganese, iron, cobalt, nickel, copper, zinc, lead, silver and cadmium. Hence, where the elemental compound is sulfur, the metal chalcogenide may have the formula MS or $M_2S$. The metal chalcogenide may have one or more of the following properties (1) a high melting point and a high decomposition temperature in a reducing atmosphere, (2) a low solubility product constant ($K_{sp}$) that allows for high-yield synthesis of the porous particle, (3) be environmental friendly, and/or (4) low cost and abundant in supply. The metal chalcogenide may be of uniform shape and/or size. The metal chalcogenide may be a metal sulfide selected from, but not limited to, MnS, FeS, CoS, NiS, CuS, $Cu_2S$, ZnS, PbS, $Ag_2S$, or CdS. The metal sulfide may be ZnS. The various properties of the metal sulfides listed above are provided in Table 1 below.

TABLE 1

| Sulfide | $K_{sp}$ | Melting point | Max. temperature stable in $H_2$[2] |
|---|---|---|---|
| MnS | $3 \times 10^{-11}$ | 1610 | 1244 |
| FeS | $8 \times 10^{-19}$ | 1118 | 273 |
| CoS | $5 \times 10^{-22}$ | 1117 | 134 |
| NiS | $4 \times 10^{-20}$ | 976 | 129 |
| CuS | $8 \times 10^{-37}$ | 507[1] | −39.7 |
| ZnS | $2 \times 10^{-25}$ | 1700 | 979 |
| PbS | $3 \times 10^{-28}$ | 1114 | 423 |
| $Ag_2S$ | $8 \times 10^{-51}$ | 825 | −76.6 |
| CdS | $1 \times 10^{-27}$ | 1750 | 741 |

[1]Decomposed into $Cu_2S$
[2]Based on the thermal dynamic calculation $\Delta G = \Delta H - T\Delta S$ The elemental compound precursor may take on a spherical shape or at least substantially spherical. The diameter of the elemental compound precursor (or equivalent diameter thereof) may be in the range of about 50 nm to about 5000 nm, about 50 nm to about 100 nm, about 50 nm to about 500 nm, about 50 nm to about 1000 nm, about 50 nm to about 2000 nm, about 50 nm to about 3000 nm, about 50 nm to about 4000 nm, about 100 nm to about 5000 nm, about 500 nm to about 5000 nm, about 1000 nm to about 5000 nm, about 2000 nm to about 5000 nm, about 3000 nm to about 5000 nm, or about 4000 nm to about 5000 nm.

The elemental compound precursor may be thermally stable.

As mentioned above, a void may be present between the shell and the core as the elemental compound precursor oxidizes. The void may be attributable to the loss of the metal from the metal chalcogenide as the metal chalcogenide oxidizes to form the elemental compound (which is the chalcogen). This may be due to the differences in the density and formula weight of the elemental compound precursor and elemental compound, leading to significant volume shrinkage within the core region of the particle. The resultant particle may be deemed to have a yolk-shell structure in which the elemental compound forms the yolk of the electrically conductive shell. Where the porous particle is used in a rechargeable battery, the presence of the void within the porous particle may allow for the expansion of the elemental compound as the rechargeable battery discharges. The yolk-shell strategy then results in elemental compound protected inside a protective shell while having a volume much smaller than the electrical conductivity required for battery application.

The void volume can be controlled or tuned by controlling the reaction conditions or amounts of chemicals used. For example, the concentration of the oxidation agent, and/or the oxidation time can be controlled.

The oxidation agent may be selected from, but is not limited to, $Fe^{3+}$, $C^{3+}$, $Sn^{4+}$, $MnO_4^-$, $Cr_2O_7^{2-}$, $ClO_4^-$, $ClO_3^-$, $HNO_3$, $F_2$, $O_2$, $O_3$, $Cl_2$, $Br_2$, $I_2$ and $I_3^-$. The salts of $Fe^{3+}$, $Co^{3+}$ and $Sn^{4+}$ ions may include, but are not limited to, acetate, chloride, nitrate, sulfate and phosphate. The salts of $MnO_4^-$, $Cr_2O_7^{2-}$, $ClO_4^-$ and $ClO_3^-$ ions may include, but are not limited to, lithium, sodium and potassium salts.

Where the metal chalcogenide is a metal sulfide, the elemental compound is sulfur and the oxidation agent is a ferric salt, the metal sulfide is oxidised to elemental sulfur via the following reaction:

[Math. 1]

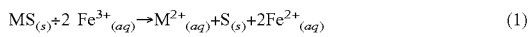

$$MS_{(s)} + 2\ Fe^{3+}_{(aq)} \rightarrow M^{2+}_{(aq)} + S_{(s)} + 2Fe^{2+}_{(aq)} \quad (1)$$

The method may further comprise the step of forming the electrically conductive shell. The electrically conductive shell may be a continuous shell in which the electrically conductive shell may substantially coat or cover most if not all of the surface of the elemental compound precursor (as well as the resultant elemental compound). The electrically conductive shell may be porous. The electrically conductive shell may contain micropores which allow the entrance of an oxidation agent into the core region of the particle and the egress of freed ions (generated from the oxidation of the elemental compound precursor) from the core region of the particle.

The electrically conductive shell may be carbon. The carbon may be graphite, graphene, carbon nanotubes or amorphous carbon (such as carbon black). The carbon shell may be derived from a carbon precursor. The carbon precursor may be mixed with the elemental compound precursor to form a mixture. In the mixture, the carbon precursor may at least partially coat the elemental compound precursor. The carbon precursor may be in a resin form so as to hold or support the elemental compound precursor in a matrix configuration. The mixture may then be subjected to a carbonization process in which the mixture is heated to a temperature in the range of about 200° C. to about 1000° C., about 200° C. to about 300° C., about 200° C. to about 400° C., about 200° C. to about 500° C., about 200° C. to about 600° C., about 200° C. to about 700° C., about 200° C. to about 800° C., about 200° C. to about 900° C., about 300° C. to about 1000° C., about 400° C. to about 1000° C., about 500° C. to about 1000° C., about 600° C. to about 1000° C., about 700° C. to about 1000° C., about 800° C. to about 1000° C., or about 900° C. to about 1000° C. The carbonization temperature may be about 900° C.

The carbon precursor may be an organic compound. The organic compound may be a polymer selected from the group consisting of a polyalkylene, polystyrene, polyacrylate, poly halide, polyester, polycarbonate, polyimide, phenol formaldehyde resin, epoxy, polyalkylene glycol and polysaccharide. The polymer may be selected from the group consisting of polyethylene, polypropylene, polymethylmethacrylate, polyvinyl chloride, polyethylene terephthalate, polyethylene glycol, polypropylene glycol, starch, glycogen, cellulose and chitin.

Hence, the method may be viewed as an indirect pathway of preparing a porous particle in which an elemental compound is present in the core of a porous particle. The thermally stable elemental compound precursor may be coated with a carbon precursor and may undergo a carbonization reaction to form the electrically conductive carbon shell on the elemental compound precursor. Hence, the elemental compound precursor can be regarded as a sacrificial template that is able to withstand the high temperature required for the carbonization reaction. The elemental compound precursor then undergoes an oxidation reaction in the presence of an oxidation agent to form the elemental compound and free ions. Due to the differences in density and formula weight of the elemental compound precursor and the elemental compound, significant volume shrinkage is observed during the oxidation process. Such shrinking leads to the creation of the desired yolk-shell structure characterised by a void between the electrically conductive shell and the elemental compound. The freed ions then slowly leeched out from the intrinsic interstitial void and micropores on the carbon shell without damaging the carbon shell to form the resultant porous particle.

In this indirect pathway, direct carbonization of the elemental compound is avoided. By avoiding direct carbonization (in which the elemental compound sulfur will be subjected to a high temperature which can cause the vaporization and disappearance of the elemental compound), this method ensures that the elemental compound is retained in the porous particle and be encapsulated by the electrically conductive shell.

The method may lead to a porous particle having different weight ratios between the elemental compound and the shell. The weight ratio of the elemental compound to the shell may be in the range of about 0.5:1 to about 3:1. The weight ratio of the elemental compound to the shell may be about 0.5:1, 1:1 or 3:1. The weight percentage of the elemental compound may be in the range of about 10% to about 90%, about 10% to about 20%, about 10% to about 40%, about 10% to about 60%, about 10% to about 80%, about 20% to about 90%, about 40% to about 90%, about 60% to about 90%, about 80% to about 90%, or about 20% to about 60%. The amount of the elemental compound in the porous particle can be controlled by controlling the amount of carbon precursor used.

The volume occupancy of the core (made up of the elemental compound) within the porous particle may be about 5% to about 90%, about 5% to about 10%, about 5% to about 20%, about 5% to about 30%, about 5% to about 40%, about 5% to about 50%, about 5% to about 60%, about 5% to about 70%, about 5% to about 80%, about 10% to about 90%, about 20% to about 90%, about 30% to about 90%, about 40% to about 90%, about 50% to about 90%, about 60% to about 90%, about 70% to about 90%, or about 80% to about 90%.

The porous particle may have a diameter in the range of about 50 to about 5000 nm, about 50 to about 100 nm, about 50 to about 500 nm, about 50 to about 1000 nm, about 50 to about 2000 nm, about 50 to about 3000 nm, about 50 to about 4000 nm, about 100 to about 5000 nm, about 500 to about 5000 nm, about 1000 to about 5000 nm, about 2000 to about 5000 nm, about 3000 to about 5000 nm, about 4000 to about 5000 nm, or about 100 to about 500 nm.

The porous particle may have a shell thickness in the range of about 1 to about 50 nm, about 1 to about 10 nm, about 1 to about 20 nm, about 1 to about 30 nm, about 1 to about 40 nm, about 10 to about 50 nm, about 20 to about 50 nm, about 30 to about 50 nm, about 40 to about 50 nm, or about 5 to about 10 nm.

The method may result in a plurality of porous particles being formed in which the electrically conductive shells are in close proximity with each other. Due to the interconnected shells, this may ensure that good electrical contact is maintained from one particle to the other, ensuring that the plurality of porous particles (which may form a matrix) has good electrical conductivity as a whole. Hence, the plurality of porous particles may form an interconnected 3-dimensional matrix where the electrically conductive shells are in close proximity or in direct contact with each other.

There is also provided a porous particle comprising an electrically conductive shell encapsulating a core, the core comprising an elemental compound precursor oxidizes in the presence of an oxidation agent to form an elemental compound. The elemental compound may reversibly reduce in the presence of a cation and oxidizes in the absence of the cation. As the elemental compound is formed during oxidation of the elemental compound precursor, a void is formed which is present between the shell and the elemental compound.

There is also provided a cathode comprising a plurality of porous particles, each porous particle made according to the method as defined herein, wherein each porous particle comprises an electrically conductive shell encapsulating a core, the core comprising an elemental compound that reversibly reduces in the presence of a cation and oxidizes in the absence of the cation.

There is also provided a battery comprising (a) an anode; (b) the cathode as defined herein; and (c) an electrolyte comprising the cation. In the battery, the cation may be dissociated from the anode. The cation may be chosen from the group consisting of lithium, sodium, potassium, rubidium, beryllium, magnesium, calcium, strontium and barium.

The anode may be chosen from, but not limited to, lithium, sodium, potassium, rubidium, beryllium, magnesium, calcium, strontium, barium or a graphene rod plated with any of these metals or a combination thereof.

The cathode electrode may be manufactured by, but not limited to, mixing the porous particles in an organic solvent along with a binder and a conductive material to produce a slurry, applying the slurry to a current-collector for cathode such as an aluminum sheet or aluminum mesh and then drying it. The binder may be chosen from, but not limited to, polyvinylidene chloride (PVdF), polyacrylonitride (PAN), poly vinyl chloride (PVC), methyl methacrylate (PMMA), poly methyl acrylate (PMA) or other suitable binders as would be known to a skilled person in the art. The conductive material may be chosen from, but not limited to, carbon black, graphene, or graphite.

The electrolyte may be chosen from, but is not limited to, lithium hexafluorophosphate ($LiPF_6$), lithium hexafluorarsenate ($LiAsF_6$), lithium perchlorate ($LiClO_4$), lithium bis(trifluoromethanesulfonimide) ($LiN(CF_3SO_2)_2$) and lithium trifluorosulfonate ($CF_3SO_3Li$).

When the porous particles (such as carbon containing sulfur particles) are used in a battery, due to the presence of the electrically conductive shell, the dissolution and subsequent leakage of lithium polysulfides generated during a battery discharge may be substantially prevented or reduced. The lithium polysulfides may be generated due to the reduction of the elemental sulfur on the cathode in the presence of the lithium cation (which may be present in the electrolyte as it dissociates from the anode or which may initially be present in the electrolyte) to form lithium polysulfides (such as $Li_2S_n$, where n can be 8, 6, 4, 3, 2 or 1 depending on the discharge process). Where n is 1, the lithium polysulfide is termed as lithium sulfide. The lithium polysulfides then oxidize during charging (which involves the dissociation of the lithium cation from the lithium polysulfides) through a series of intermediary complexes of $Li_2S_n$ (n being 2, 3, 4, 6, or 8), depending on the charge process, that may result in the formation of the elemental sulfur or a final lithium polysulfide. Furthermore, as the lithiation of sulfur during discharge results in an increased volume of about 80%, the material encapsulating the sulfur may allow for the increase in volume that happens when the reaction between the sulfur and the lithium is complete. Lastly, the encapsulating material may compensate for the poor electrical conductivity of sulfur.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic diagram representing the method of forming a porous particle in accordance to one embodiment.

FIG. 2A is a scanning electron microscopy (SEM) image of ZnS spherical nanoparticles obtained via a hydrothermal method in accordance with Example 1. The scale bar in FIG. 2A is 1 micron.

FIG. 2B is a transmission electron microscopy (TEM) image of ZnS spherical nanoparticles obtained via a hydrothermal method in accordance with Example 1. The scale bar in FIG. 2B is 50 nm.

FIG. 3A is a TEM image of carbon coated ZnS hollow spheres. The scale bar in FIG. 3A is 50 nm.

FIG. 3B is a TEM image of a carbon nanoparticle containing sulfur, in which the nanoparticle has a yolk-shell configuration. The scale bar in FIG. 3B is 50 nm.

FIG. 4A is a SEM image of a carbon coated ZnS nanoparticle. The scale bar in FIG. 4A is 1 micron.

FIG. 4B is a TEM image of the same carbon coated ZnS nanoparticle as FIG. 4A. The scale bar in FIG. 4B is 200 nm.

FIG. 4C is a SEM image of a carbon containing sulfur nanoparticle denoted as CS1 made in accordance with Example 1. The scale bar in FIG. 4C is 1 micron.

FIG. 4D is a TEM image of the same nanoparticle as FIG. 4C. The scale bar in FIG. 4D is 200 nm.

FIG. 4E is a SEM image of a carbon containing sulfur nanoparticle denoted as CS2 made in accordance with Example 1. The scale bar in FIG. 4E is 1 micron.

FIG. 4F is a TEM image of the same nanoparticle as FIG. 4E. The scale bar in FIG. 4F is 200 nm.

FIG. 4G is a SEM image of a carbon containing sulfur nanoparticle denoted as CS3 made in accordance with Example 1. The scale bar in FIG. 4G is 1 micron.

FIG. 4H is a TEM image of the same nanoparticle as FIG. 4G. The scale bar in FIG. 4H is 200 nm.

FIG. 4I is a SEM image of a carbon containing sulfur nanoparticle denoted as CS4 made in accordance with Example 1. The scale bar in FIG. 4I is 1 micron.

FIG. 4J is a TEM image of the same nanoparticle as FIG. 4I. The scale bar in FIG. 4J is 200 nm.

FIG. 5A is a graph comparing the various X-ray powder diffractions of a commercial sulfur, a carbon-containing sulfur nanoparticle and a carbon-containing ZnS nanoparticle. Graph from top to bottom: Commercial S, S@C and ZnS@C.

FIG. 5B is a graph comparing the thermal gravimetric analysis of the various carbon containing sulfur nanoparticles (CS1, CS2, CS3 and CS4) made in accordance with Example 1. Graph: CS1 (—), CS2 (- - -), CS3 (• • •) and CS4 (- • -).

FIG. 6 is a graph showing the Li—S battery performance test of the various carbon containing sulfur nanoparticles (CS1, CS2, CS3 and CS4) made in accordance with Example 1. Graph: CS1 (▼), CS2 (▲), CS3 (●), CS4 (■) and coulombic efficiency (solid line).

FIG. 7 is a schematic diagram representing a method as depicted in Comparative Example 1 in which a porous carbon nanoparticle was impregnated with sulfur using a conventional melt-diffusion process.

FIG. 8 is a SEM image at 20,000× magnification of the resultant product obtained from the method of FIG. 7, showing the presence of micron-sized sulfur particles.

FIG. 9 is a graph comparing the Li—S battery performance between the carbon containing sulfur nanoparticle denoted as CS1 made in accordance with Example 1 and the carbon containing melt impregnated sulfur nanoparticle denoted as MCS made in accordance with Comparative Example 1.

FIG. 10A is a elemental mapping of the carbon containing sulfur nanoparticle in which sulfur is present in the core of the particle which has a carbon shell.

FIG. 10B is an elemental mapping of the carbon shell portion of the nanoparticle of FIG. 10A.

FIG. 10C is an elemental mapping of the core (sulfur) portion of the nanoparticle of FIG. 10A.

DETAILED DESCRIPTION OF DRAWINGS

Referring to FIG. 1, there is shown a schematic diagram of a method 100 of forming a porous particle 2. The porous particle 2 comprises an electrically conductive shell 20 encapsulating an elemental compound 22 in the core. In the method 100, a plurality of elemental compound precursor 4 particles are mixed with carbon precursor 6 to form a mixture of both precursors 8. The carbon precursor may be in a resin form so as to hold the elemental compound precursor 4 particles in a matrix configuration. The mixture 8 is then subjected to a forming step 10 (such as a carbonization step) to form the electrically conductive shell 20 from the carbon precursor 6. The particle 12 then comprises an electrically conductive shell 20 encapsulating the elemental compound precursor 4. The particle 12 is then subjected to oxidation in the presence of an oxidation agent 14 to oxidise the elemental compound precursor 4 to elemental compound 22. The resultant porous particle 2 is then formed. When the porous particle 2 is part of a cathode of a rechargeable battery, the elemental compound 22 within the porous particle polymerizes during discharge of the cathode to form a poly(elemental compound) 24 (that is still encapsulated by the electrically conductive shell 20). The poly(elemental compound) 24 dissociates during charging of the cathode to revert back to the elemental compound 22.

EXAMPLES

Non-limiting examples of the invention and a comparative example will be further described in greater detail by reference to specific Examples, which should not be construed as in any way limiting the scope of the invention.

Experimental

General Synthetic Procedure of Sulfur Containing Carbon Yolk-Shell Nanostructures:

The method 100 depicted in FIG. 1 is used here to synthesize zinc sulfide nanoparticles (ZnS NP) by hydrothermal process. In the process, equal mol of zinc acetate dehydrate (with 2 mol $H_2O$), $Zn(CH_3COO)_2 \cdot 2H_2O$, and thiourea, $H_2NC(=S)NH_2$, were added into deionized water to form the precursor solution. Gum arabic was then added as a surfactant for the formation of the nanospheres. The mixture was stirred and sonicated to ensure complete dissolution of the reagents, before it was transferred into an autoclave which was then sealed and placed into an oven for a reaction at 120° C. over 12 hours. The resultant white precipitate of zinc sulfide was retrieved via centrifugation, washed with deionized water for 3 times and dried at 70° C. for 3 hours. A small volume of acetone solution of phenol formaldehyde (PF) resin was thoroughly mixed with the zinc sulfide nanoparticles through stirring and sonication for about 10 minutes before the mixture was dried in a vacuum over 5 hours. The samples were then subjected to high temperature treatment in a tube furnace at 900° C. under argon gas for 1 hour. The treated samples were ground into fine powder using a mortar and pestle, and ferric nitrate aqueous solution was added to the sample and left with stirring overnight in an ice water bath to convert the zinc sulfide to sulfur. The sulfur-in-carbon samples were recovered via centrifugation, and concentrated HCl was added to each sample as a precaution to remove any possible zinc sulfide residue. After the removal of HCl via centrifugation, the obtained sample was further washed 3 times with deionized water, subsequently dried at 70° C. for 3 hours, prior to use for further characterization and battery testing. All chemicals used were obtained from Sigma-Aldrich (of Missouri of the United States of America) or from Alfa Aesar (of Massachusetts of the United States of America).
Characterization:

Scanning Electron Microscope (SEM) images were taken on a JEOL JSM-6700F FESEM with an accelerating voltage of 5 kV. Transmission Electron Microscope (TEM) images were taken on a Philips CM300 FEGTEM with an accelerating voltage of 200 kV. X-ray diffraction was recorded on Bruker D8 General Area Detector Diffraction System using Cu Kα radiation. Thermogravimetric analysis was conducted on a TA instruments TGA Q500 at a heating rate of 10° C. min$^{-1}$ under nitrogen gas. Elemental analysis was carried out using the Flash EA1112 Elemental Analyzer from Thermo Scientific.
Battery Testing:

To fabricate the working cathodes for battery testing, the samples were each mixed with carbon black (Denka) and polyvinylidene binder dissolved in N-methyl-2-pyrolidinone in a weight ratio of (8:4:3) to form a black colored slurry. This slurry was then coated evenly onto an aluminum foil using doctor blade. The foil was dried in an oven at 70° C. for 3 hours and the working cathodes were cut out from the foil using a hole puncher with a diameter of 15 mm. CR2032 type coin cells were assembled in a glove box with argon environment using lithium foil as counter anodes. The electrolyte used was lithium bis(tri-fluoromethanesulfonyl) imide dissolved in 1:1 (v/v) mixture of 1,2-dimethoxyethane and 1,3-dioxolane, with lithium nitrate and dilithium hexasulfide ($Li_2S_6$) as additives. The concentrations of the 3 lithium salts were 1M, 0.5M and 0.2M, respectively. Lithium-sulfur battery cycling tests were performed on Neware battery tester with the electric potential set as 1.5 to 3.2 V. Capacity values was calculated based on the weight of composite material. The mass loading of composite (carbon and sulfur) is around 2.2 mg per electrode.

Example 1—Synthesis of Sulfur Containing Carbon Yolk-Shell Nanostructures

ZnS nanoparticles were prepared using 65.85 g (0.3 mol) of zinc acetate dihydrate (FW: 219.50 g/mol) and 22.84 g (0.3 mol) of thiourea (FW: 76.12 g/mol) following the method described above. The amount of gum arabic used was 3 g. For the carbon coating formation, 0.5 g of ZnS nanoparticle was taken, and the PF resin acetone solution had a concentration of 0.5 g mL$^{-1}$. Four samples of the ZnS nanoparticles were prepared in this example based on varying amounts of the PF resin acetone solution used (0.5 mL, 0.4 mL, 0.2 mL and 0.1 mL). For the sulfur formation process, the ferric nitrate applied had a concentration of 0.1 g mL$^{-1}$, and the volume used was 20 mL. The resultant samples were denoted as CS1, CS2, CS3 and CS4, respectively The weight ratio of sulfur and carbon obtained in the nanoparticles as assessed by thermogravimetry is disclosed in the following Table 2:

TABLE 2

| Sample | TGA Analysis | |
|---|---|---|
| | Sulfur (wt. %) | Carbon (wt. %) |
| CS1 | 33.8 | 66.2 |
| CS2 | 42.9 | 56.9 |
| CS3 | 54.0 | 46.0 |
| CS4 | 74.8 | 25.2 |

The ZnS nanoparticles synthesized were typically about 250 nm in diameter (FIG. 2A and FIG. 2B). From the TEM image (FIG. 2B), one can see that these uniform particles were essentially secondary particles, arising from the assembly of ZnS nanoparticles (primary particles) with a diameter of 4 to 5 nm. Such structure showed the following advantages: 1) it possessed large population of micropores that allowed the oxidative ferric ions to easily impregnate into the nanoparticles; 2) the much smaller primary particles were more reactive; 3) some voids were reserved in the materials. Advantages (1) and (2) enabled easier and faster conversion of sulfide to sulfur, while advantage (3) facilitated the formation of the S@C yolk-shell structure (see FIG. 3B where the sulphur yolk is circled) with a void having a large volume percentage (as will be discussed later).

When the ZnS nanoparticles containing phenol formaldehyde (PF) acetone dispersion was slowly dried at room temperature, the nanoparticles self-assembled into layered structure with PF resin filling the inter-particle voids which essentially coated over all these particles. As the dried composite (ZnS@resin) was carbonized in a tube furnace at high temperature in an inert atmosphere, interconnected carbon-coated ZnS nanoparticles were obtained. Representative SEM and TEM images of such composite material post-carbonization (ZnS@C) are shown in FIG. 3A, FIG. 4A and FIG. 4B, where carbon-coated ZnS hollow spheres are clearly visible.

As the ground ZnS@C composite was soaked in ferric nitrate aqueous solution, the chemical reaction shown in equation (2) took place where zinc sulfide was converted to element sulfur and free zinc ions which can be washed away using deionized water.

[Math. 2]

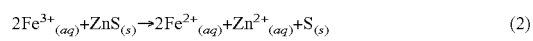

$$2Fe^{3+}_{(aq)} + ZnS_{(s)} \rightarrow 2Fe^{2+}_{(aq)} + Zn^{2+}_{(aq)} + S_{(s)} \quad (2)$$

Loss of the zinc ions which contributed to ⅔ of the weight of zinc sulfide resulted in the generation of voids of large percentage volume within the carbon shells. Though the produced sulfur may exhibit a volume that is larger than its partial volume in the original ZnS, it by no means compensated for the loss in volume caused by the removal of zinc ions. In an ideal conversion where all sulfides are converted to sulfur that is retained in the shell, a volume reduction of 34.7% (smaller than the weight portion of ⅔) can be anticipated. The voids will present a larger volume percentage for incomplete conversion of ZnS (removed by washing with concentrated HCl). Hence, the void volume can be tuned by controlling the extent of sulfide conversion which is achievable by varying reaction conditions, such as the concentration of ferric nitrate, the soaking time, etc. In this way, carbon encapsulated sulfur nanoparticles (S@C) in yolk-shell nanostructure can be harvested with controlled void volume percentage.

In this Example, the average volume shrinkage is typically 80%, if the outer diameter of the sulfur nanospheres and the internal diameter of the "hollow carbon" are measured in the TEM images. Since volumetric expansion of sulfur during discharge process in lithium sulfur batteries is calculated to be about 78.7%, this incidental match between volume-available and volume-in-need suggests a straightforward production of useful S@C materials based on the method defined herein.

The sulfur content in S@C can be balanced by changing the amount of PF resin used, and TEM images of a series of the yolk-shell S@C with different sulfur content are shown in FIG. 4C to FIG. 4J. Low sulfur content (FIG. 4C to FIG. 4F) generally facilitated the formation of an interconnected 3D carbon matrix that is beneficial to electron conductivity, yielding better battery performance at high charge-discharge rates. With the increase of sulfur content, the thickness of carbon shell will be reduced. Once the sulfur content reached 50 wt % and above (FIG. 4G to FIG. 4J), the carbon matrix was broken and individual S@C particles formed. In this case the electron conductivity was compromised, which worsens the rate performance in battery test. Nevertheless, a high sulfur content is essential for high specific capacity in batteries. Therefore, it is crucial to balance the carbon/sulfur ratio so that a continuous carbon matrix with maximized sulfur content can be achieved. From the TEM images, an optimized thickness of the carbon coatings is about 5 nm and the diameter of the sulfur nanospheres contained within these carbon shells is about 140 nm.

The structure of ZnS@C and S@C composites were verified by powder XRD patterns, as shown in FIG. 5A. It can be seen that the ZnS obtained via hydrothermal method possessed a cubic phase (zinc blende or sphalerite), and the three strong peaks at 28.5°, 47.5° and 56.4° corresponded to the crystal planes of (111), (220) and (311), respectively. For S@C, all the diffraction peaks from the samples matched well with that of the orthorhombic phase of crystalline sulfur (XRD pattern of commercial S is shown as reference), proving the existence of such crystalline sulfur in the composite material.

The thermogravimetric analysis was used to determine the actual sulfur content in the S@C composite obtained, and the profiles are presented in FIG. 5B. The weight loss from 150 to 500° C. was attributed to the evaporation of sulfur (melting point: 115.2° C.; boiling point: 444.6° C.). Details of the TGA profiles were analyzed and the calculated sulfur content for all S@C composites was summarized in Table 2 above. It is obvious that by controlling the amount of PF resin used, the sulfur content was tunable between 33.8 wt % to 74.8 wt %. The composition of the S@C composites was also further confirmed by the data obtained in elemental analysis.

Example 2—Battery Performance

The cycling performance of the developed S@C yolk-shell materials was tested in Li—S batteries and the results are shown in FIG. 6. The initial discharge capacity of samples CS1, CS2, CS3 and CS4 were 443, 548, 796 and 878 mAh gram per electrode (including composite, carbon black and binder), respectively. The rate of capacity fading was very similar for CS1 to CS3 with thicker carbon shell; however, a much faster capacity fading was observed for CS4 that possessed the thinnest carbon shell and the highest capacity. After 20 cycles of discharge-charge processes, the discharge capacity of CS4 dropped to a value which is lower than that of CS3. The poorer cyclability of CS4 can be attributed to the thin carbon shell that was inadequate to prevent the polysulfides from leaking out of the carbon spheres. Therefore, it is crucial to have a balanced C and S content for high capacity and good cyclability of Li—S batteries, and the optimal ratio is around 1:1.

Comparative Example 1—Synthesis of Reference Sample (Porous Carbon Nanostructures with Melt-Impregnated Sulfur)

Fresh prepared carbon-sulfur composite (for example CS2) was soaked in toluene for 1 hour to remove the sulfur within the pores. The resulting porous material was recovered by centrifugation, washed repeatedly with toluene and then dried in oven at 70° C. for 12 hours. The obtained porous carbon was mixed with elemental sulfur in a 1:1 weight ratio and sulfur was impregnated into empty pores via the conventional melt-diffusion process in the autoclave at 150° C. for 12 hours. The final product was ground into fine powder using a mortar and pestle, and denoted as MCS. The method is summarised in FIG. 7.

The sample MCS exhibited poor morphology control. A representative SEM image (FIG. 8) of MCS showed ill-defined morphology with numerous micron-sized sulfur particles on the surface of carbon matrix. As the electrical conductivity of sulfur is very low, these micron-sized sulfur particles gave poor electrical contact in the battery electrode and prevented the complete utilization of available sulfur, leading to much lower capacities. This is clearly shown in FIG. 9, where MCS with 50 wt % of sulfur displayed a capacity lower than that of CS1 (33.8 wt % of sulfur). The higher capacity fading rate for MCS in FIG. 9 was also caused by the unprotected sulfur on the surface of the carbon shells that readily contributed to the redox shuttle and gradually precipitated on the anode, leading to faster capacity fading.

This comparative example shows the problems with using a melt-diffusion process to impregnate a porous carbon with the sulfur. Together with another convention process of using vapour-phase infusion, these methods result in poor control over the sulfur filling content in individual pores. Either overfill (>>50% (v/v) of the pore) or underfill (<<50% (v/v) of the pore) will have significant negative impact on the battery performance. Apart from poor control over the sulfur filling content, some sulfur will unavoidably be deposited on the surface of the host material. Such unprotected sulfur will contribute readily to the redox shuttle, resulting in large capacity losses during the initial cycles.

Hence, it is clear that the S@C nanoparticles made according to the method as defined herein, that is, carbon-encapsulated sulfur in yolk-shell nanostructure from a ZnS precursor approach, is superior to the MCS sample that was made according to a conventional melt-diffusion process in term of the battery performance.

In summary, a new method to prepare S@C nanoparticles with well-defined yolk-shell nanostructure has been developed. The well-defined yolk-shell nanostructure of the S@C nanoparticles can be seen in FIG. 10A (the presence of the sulfur yolk within the carbon shell), FIG. 10B (showing the carbon shell) and FIG. 10C (showing the sulfur present as the core).

Such composite nanoparticles offer sufficient free volume to accommodate the expansion of sulfur during discharge process, and the effective carbon coating (which, as discussed above, cannot be too thin) can prevent excessive polysulfide leakage. Cathodes of such S@C materials exhibited high initial capacities and excellent cycling performance. The superiority of this method over traditional melt-diffusion methods was that (1) an even dispersion of sulfur nanoparticles can be achieved inside the pores, and (2) formation of bulk sulfur particles on the surfaces of the carbon matrix is absent or minimized. Both are crucial to a good cyclability of the lithium sulfur batteries.

INDUSTRIAL APPLICABILITY

The method as defined herein can enable the synthesis of different novel nanostructures for future high performance lithium-sulfur batteries with high specific capacity and good cyclablility. Advantageously, due to the use of the disclosed method, as compared to traditional melt-diffusion methods, (1) an even dispersion of sulfur nanoparticles can be achieved inside the pores, and (2) formation of bulk sulfur particles on the surfaces of the carbon matrix is absent or at least substantially reduced.

The porous particle made according to the method as defined herein may display superior performance when used as cathode material in a rechargeable Li—S battery, such as high initial capacities, good electric conductivity, high specific capacities and/or excellent cycling performance. In addition, the leakage of sulfur and polysulfides during battery discharge can be substantially reduced due to the presence of the shell that confines the sulfur within the nanoparticle. Moreover, due to the presence of the void in the nanoparticle, the sulfur can volumetrically expand during the discharge process while not damaging the shell. Further, due to the interconnected 3D carbon matrix between the various carbon containing sulfur nanoparticles, this results in good electrical contact.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A porous particle comprising an electrically conductive shell encapsulating a core, said core comprising an elemental compound precursor that oxidizes in the presence of an oxidation agent to form an elemental compound, wherein the elemental compound precursor is a metal chalcogenide comprising a metal selected from Group 7, 8, 9, 10, 11, 12, or 14 of the Periodic Table of Elements.

2. The porous particle according to claim 1, wherein said elemental compound reversibly reduces in the presence of a cation and oxidizes in the absence of said cation.

3. The porous particle according to claim 1, wherein a void is present between said shell and said elemental compound.

4. A cathode comprising a plurality of porous particles, each porous particle made according to a method of forming a porous particle comprising an electrically conductive shell encapsulating a core, said core comprising an elemental compound that reversibly reduces in the presence of a cation and oxidizes in the absence of said cation, said method comprising:
a) encapsulating an elemental compound precursor with said electrically conductive shell, wherein the elemental compound precursor is a metal chalcogenide comprising a metal selected from Group 7, 8, 9, 10, 11, 12, or 14 of the Periodic Table of Elements; and
b) reacting said elemental compound precursor with an oxidation agent to oxidize said elemental compound precursor to form said elemental compound, thereby forming said electrically conductive shell encapsulating said core comprising said elemental compound, wherein each porous particle comprises an electrically conductive shell encapsulating a core, said core comprising an elemental compound that reversibly reduces in the presence of a cation and oxidizes in the absence of said cation, and wherein a void is present between said shell and said elemental compound and the volume occupancy of the void between the shell and the core in the oxidized state is between about 10% to about 95%.

5. A battery comprising:
a) an anode;
b) the cathode of claim 4; and
c) an electrolyte comprising said cation.

6. The battery of claim 5, wherein said cation is dissociated from said anode.

7. The battery of claim 5, wherein said cation is selected from the group consisting of lithium, sodium, potassium, rubidium, beryllium, magnesium, calcium, strontium and barium.

* * * * *